May 22, 1923.
J. B. MULLALLY
LIQUID LEVEL GAUGE
Filed Oct. 25, 1921
1,455,965
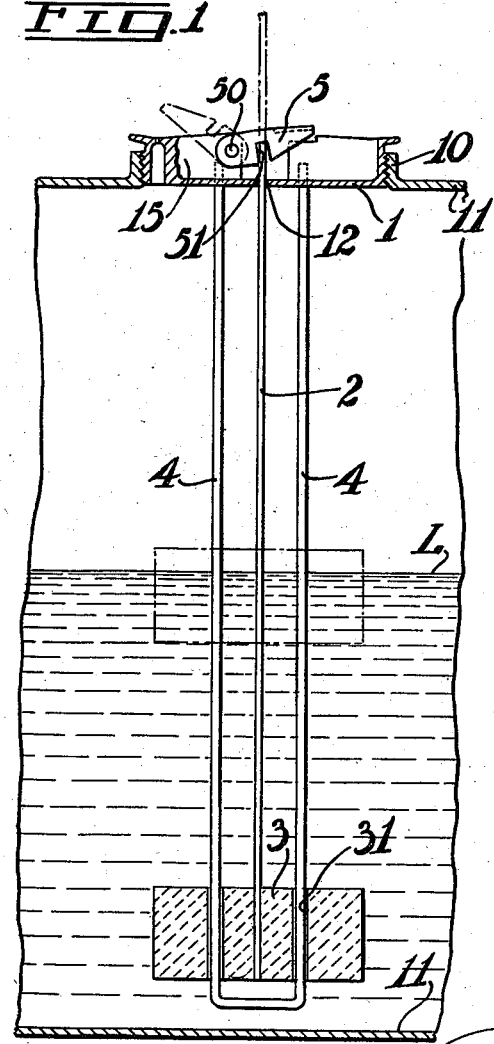
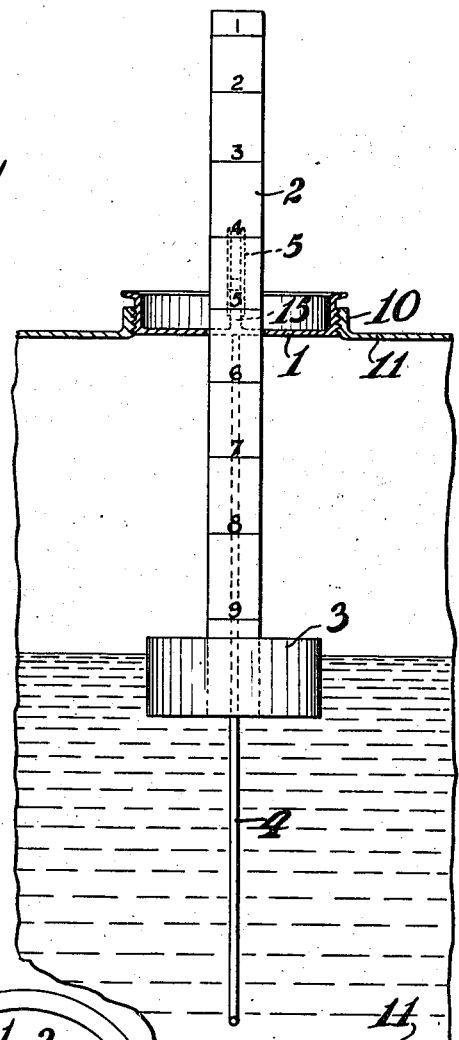
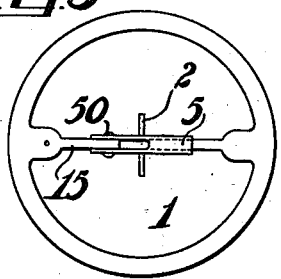
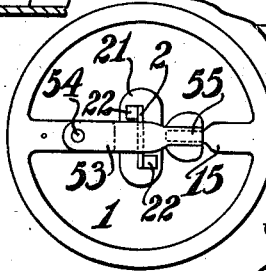
Inventor
John B. Mullally
By H. L. & S. L. Reynolds
Attorney Patented May 22, 1923.

1,455,965

UNITED STATES PATENT OFFICE.

JOHN B. MULLALLY, OF SEATTLE, WASHINGTON.

LIQUID-LEVEL GAUGE.

Application filed October 25, 1921. Serial No. 510,250.

*To all whom it may concern:*

Be it known that I, JOHN B. MULLALLY, a citizen of the United States of America, and resident of the city of Seattle, in the county of King and State of Washington, have invented certain new and useful Improvements in Liquid-Level Gauges, of which the following is a specification.

My invention relates to liquid level gauges and is particularly adapted to gauge the depth of gasoline in the tanks of certain makes of cars which are placed beneath the seat.

The principal object of my invention is to provide a gauge which may be conveniently used, which is out of the way when not in use, and which is wholly accurate and direct-acting.

A further object of my invention is to provide a gauge which may be easily and quickly inserted into the tank.

A further object is to provide, in connection with a liquid level gauge, a lock for retaining parts withdrawn into the tank and a lock which may be released to allow parts to rise and assume the gaging position.

A further object is to provide a gauge which may be employed with standard filling plugs with little change, rendering it cheap to make and convenient in use.

My invention comprises those novel parts and combinations thereof which are shown in the accompanying drawings, described in the specification and particularly defined by the claims terminating the same.

In the accompanying drawings I have shown my invention in forms which are now preferred by me.

Figure 1 is a section through a tank and my gauge shown connected thereto, parts being shown in full lines in the normal position and in dot and dash lines in the gaging position.

Figure 2 is a section through the same parts taken at right angles to Figure 1 and parts being shown in the gaging position.

Figure 3 is a plan view of the gauge, parts being shown in normal position.

Figure 4 is a plan view of a modified construction.

In certain makes of automobiles the gasoline tank lies beneath the front seat. In order to gauge the amount of gasoline therein it is necessary to raise the seat, remove the filling cap or plug, insert a stick kept for the purpose or if this is lost to insert any stick which may be handy, and then to replace the plug and seat. This is an inconvenient operation and is liable to introduce objectionable foreign matter from the measuring stick into the gasoline.

By the use of my device a gauge is provided which may be associated with the filling cap or other part of the top of the gasoline tank and which may be brought into use by the release of a simple catch, and the gaging parts of which may then be again locked so that they do not project above the tank, all this without disturbing in any manner any part of the tank or filling cap. While it is most convenient for insertion of the gauge to employ it in connection with the filling cap, this is not essential and it may be mounted in any part of the top of the tank. It has, therefore, all the advantage of a direct tank gauge, without the inconvenience thereof, and without the inaccuracy of a dashboard gauge. As shown herein, however, it is associated with the filling cap or plug 1 which is adapted to screw into a sleeve 10 defining the filling opening of the tank 11. The only change necessary in the filling cap is that a perforation 12 be provided somewhere in the cap, preferably about at its center.

Through the perforation 12 the upper end of a measuring rod 2 projects. At its lower end the rod 2 is secured in a float 3 of any suitable material. While it is preferable to employ guides, such as the U-shaped wire guides 4, these are not strictly essential. These guides if employed will pass through perforations 31 in the float 3 and will have their upper ends secured in the cap 1. They will thus guide the float 3 for vertical movement and will insure that the measuring stick 2 rises properly through the perforation 12 and does not stick therein.

With an arrangement as described, and where the level of the gasoline in the tank 11 is at some point above its bottom, as at L, the tendency of the float 3 is to rise to this level and to cause the upward projection of the measuring rod 2 above the surface of the cap 1. The measuring stick may be graduated as shown in Figure 2 to indicate the number of gallons in the tank. However, it is not feasible to permit the measuring rod 2 to extend upward except when actually gaging the depth of liquid, for the seat must be placed immediately above the tank. Even in tanks which are not covered by any other part of the machine, it is generally not convenient to have a measuring stick protruding above the tank. For this reason I provide a suitable lock to retain the measuring rod 2 and float 3 connected thereto normally depressed or withdrawn within the tank.

In my preferred form of lock I provide a locking bar 5 which is pivoted at 50 upon a transverse rib 15 of the filling cap. The point 50 is at one side of the perforation 12 and the locking bar 5 swings in a vertical plane across the path of the measuring rod 2. The bar 5 is provided with a transversely extending slot, hook or socket 51 positioned to receive the upper end of the measuring rod. As the tendency of the float and measuring rod 2 is to rise, the upper end of the rod will engage in the slot 51 in such manner as to prevent throwing the locking bar 5 out of measuring position, as is best shown in Figure 1. The bar 5 can only be thrown out of locking position by first depressing the measuring rod 2 to clear its upper end from the slot 51.

Another form of locking bar is shown in Figure 4. Herein the bar 53 is pivoted at 54 to swing in a horizontal plane, that is, in a plane parallel with the general plane of the plug 1. Its opposite end 55 lies at the opposite side of the perforation 12 from the pivot point 54 and the end 55 is bent to ride over and snap upon the rib 15, the bar 53 being somewhat resilient. By this arrangement the end of the rod 2 may be forced down into the tank 11 and a ring 21 of packing material, as rubber, held in place by stamped out fingers 22 of the measuring rod, may be employed to prevent any possible leakage of gasoline through the perforation 12.

In using this device, when it is desired to gauge the amount of liquid in the tank, it is only necessary to release the locking bar 5 or 53, when the measuring rod 2 will rise under the influence of the float 3. The amount of projection of the rod 2 from the cap 1 indicates the number of gallons remaining in the tank. The amount having been gaged the rod 2 is depressed within the tank and locked by the bar 5 or 53, when the seat may be replaced, without any interference between the seat and the rod 2. There is no adjustment of movement of the cap 1 required for gaging. When it is desired to fill the tank the filling cap 1 may be removed and the entire gauge withdrawn with the cap. The float 3 is, of course, of less circumferential extent than the filling cap 1, to permit it to be withdrawn from the filling opening 10.

What I claim as my invention is:

1. A liquid level gauge comprising a perforated cap securable in the top of a tank, a float within the tank, a measuring rod secured to the float and projecting upward through the perforation in the cap, a locking bar pivoted by one end to be swung in a vertical plane, said bar having a transverse slot engageable with the rod, whereby the buoyancy of the float, acting through the rod, maintains the slot and the rod in locked position with the rod depressed within the tank.

2. As a new article of manufacture, a liquid level gauge comprising a perforated plug for a tank opening, a U-shaped frame having its ends secured in the lower side of the plug and forming guides, a float of less circumferential extent than said plug movable upon said guides, a measuring rod secured to the float and projecting through the perforation in the plug, and a bar pivoted to swing in an axial plane of the plug, and having a transverse slot engageable with the upper end of the rod to retain it projected to its farthest position upon the lower side of the plug.

Signed at Seattle, King County, Washington, this 19th day of October, 1921.

JOHN B. MULLALLY.